United States Patent [19]

Schubert et al.

[11] 3,999,976
[45] Dec. 28, 1976

[54] METHOD FOR MELTING SCRAP IN ELECTRIC ARC FURNACES

[75] Inventors: Hans-Joachim Schubert, Moers; Eckart Schunk, Dusseldorf; Emil Elsner, Baden-Baden, all of Germany

[73] Assignee: Demag Aktiengesellschaft, Duisburg, Germany

[22] Filed: Apr. 7, 1975

[21] Appl. No.: 565,336

Related U.S. Application Data

[63] Continuation-in-part of Ser. No. 523,209, Nov. 13, 1974, abandoned, which is a continuation of Ser. No. 311,541, Dec. 4, 1972, abandoned.

[30] Foreign Application Priority Data

Dec. 4, 1971   Germany .......................... 2160239

[52] U.S. Cl. .......................................... 75/12; 13/12
[51] Int. Cl.² .......................... C21C 5/52; H05B 7/18
[58] Field of Search .................. 75/12; 13/9, 12, 13

[56] References Cited

UNITED STATES PATENTS

| | | | |
|---|---|---|---|
| 3,536,817 | 10/1970 | Carroll | 13/12 |
| 3,565,603 | 2/1971 | Klee | 75/11 |
| 3,662,075 | 5/1972 | Sakai | 13/13 |
| 3,767,831 | 10/1973 | Plockinger | 75/10 R |
| 3,857,697 | 12/1974 | Antoine | 13/9 |

*Primary Examiner*—Peter D. Rosenberg
*Attorney, Agent, or Firm*—Mandeville and Schweitzer

[57] ABSTRACT

A method is provided for lengthening the life of electric arc furnace linings in the production of steel from scrap, while at the same time introducing sponge iron pellets to shorten the melting time. This is achieved by predetermining the increase in power at the arc-molten bath interface upon introduction of the sponge iron and automatically reducing the power factor in the circuits feeding the electrodes according to the predetermination, upon each introduction of sponge iron.

4 Claims, 1 Drawing Figure

METHOD FOR MELTING SCRAP IN ELECTRIC ARC FURNACES

BACKGROUND AND SUMMARY OF THE INVENTION

This is a continuation-in-part of U.S. application Ser. No. 523,209, filed Nov. 13, 1974, and now abandoned, which, in turn, is a continuation of application Ser. No. 311,541, filed Dec. 4, 1972, now abandoned.

There are many known methods for producing steel from solid ferrous material, such as metal scrap, in electric arc furnaces, where scrap is transformed into a metal bath and iron sponge is then added.

Unexpectedly, the life spans of the furnace linings in such furnaces, as opposed to reduction furnaces, for example, have been shorter than if no iron sponge pellets were used. Therefore, the economy achieved from the use of iron sponge particles to speed the melting process is diluted or eliminated completely by the increased cost in replacing the linings more frequently.

The present invention overcomes this problem in the use of electric arc furnaces by eliminating the destructive influences affecting the life span of such furnace linings while simultaneously allowing the advantages of the use of sponge iron to increase processing speed. This is achieved by reducing the power feeding the furnace electrodes during furnace charging of the sponge iron to a specified level suitable to the melting process. This specified level continues the melting process but not at a level destructive to the furnace linings.

The proposed solution is based on the discovery that the operating conditions within the furnace change upon introduction of sponge iron pellets so that the effective power increases as the arc is affected by such introduction. This change of the arc causes localized overheating, especially at the linings, thereby deleteriously affecting the linings and shortening their useful life.

It has been shown that this increase may be as much as 10% based upon the same amount of power being fed to the electrodes through the control circuit therefor. It has been discovered, in accordance herewith, that when melting scrap, the voltage across the arc tends to assume a rectangular wave pattern. As the scrap changes to a liquid bath, the voltage changes to a sine wave pattern. Thereafter, when sponge iron is added, the sine wave pattern becomes much more distinct, causing a substantial reduction in the harmonic content. At this point, when the voltage is graphically shown, the sine wave is distinctly shown.

Thus, in accordance herewith, and depending upon the specific operating conditions, this effect can be measured and the increase in effective power predetermined. This measured predetermined increase can then be introduced into the circuit feeding the electrodes to automatically reduce the power to the electrodes by the predetermined amount upon the introduction of the sponge iron.

In this manner, the power level feeding the electrodes is reduced while simultaneously still maintaining the proper melting level required for the process. Moreover, that level is still not decreased so much as to affect the advantages of the use of the sponge iron in the first place.

In accordance with the invention, it has proven advantageous to reduce the power to the bath to its original value, i.e., the value used when melting metal scrap or, if necessary, to a value even below this. The electrode control is set at the beginning or during the feeding and the melting of the sponge iron materials to a predetermined value which is best suitable to the completion of the processing at that phase.

In order to practice the invention, the control circuits for feeding the furnace electrodes may include additional current and voltage regulating resistances which are selectively adjusted. Preferably, the resistances will be controlled automatically by means of a switch whose operation is related to the material supply or charge of the furnace.

As will be understood, the switch causes a change in current by short circuiting the current regulating resistances. This change may also be achieved by changing the voltage regulating resistance.

In addition, an auxiliary source of electrical voltage may be provided (either directly in the electrode circuit or as a differential circuit). Such an auxiliary source of electrical voltage (which may be leading or lagging the main alternating voltage source) causes an alteration in the current and, therefore, the effective power at the arc. As will be apparent, the switching device can also be operated manually.

As purely illustrative of apparatus which may be useful in carrying out the process of the invention, reference is made to the following drawing showing a control circuit for controlling the operation of an electric arc furnace.

DESCRIPTION OF THE INVENTION

Figure 1:
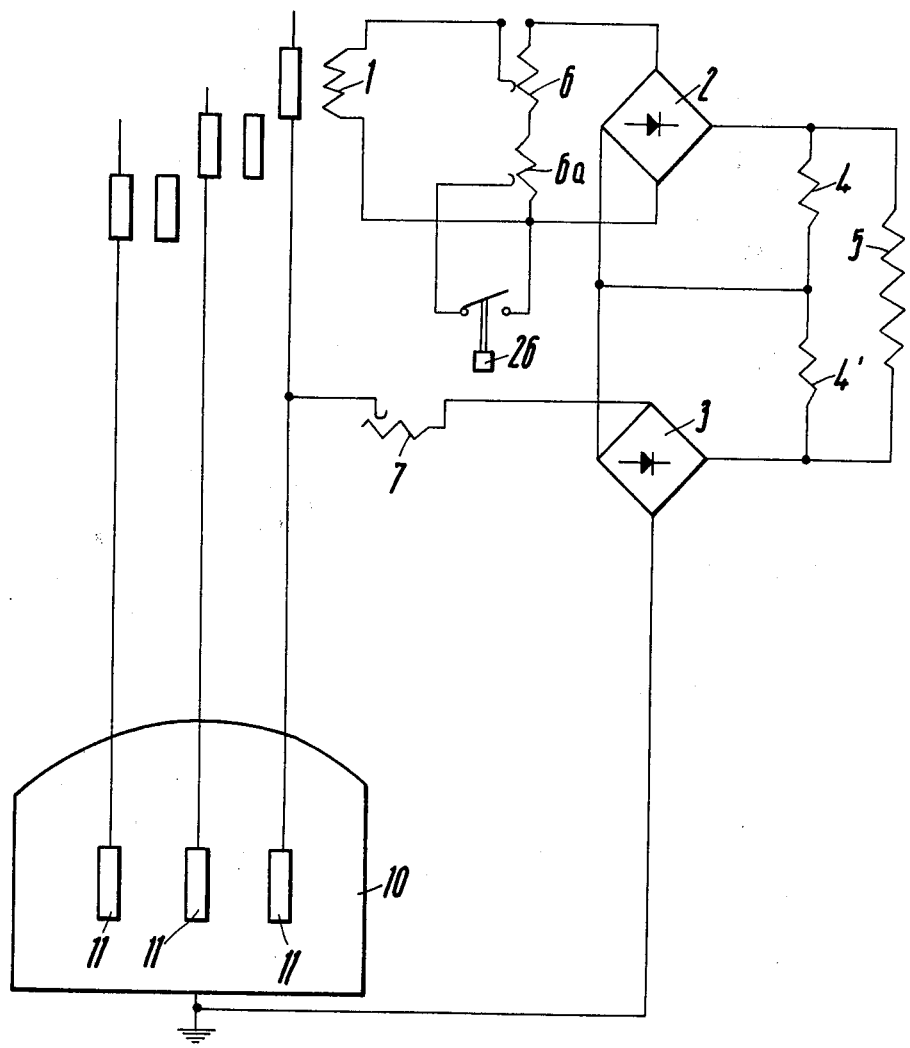
FIG. 1 is a schematic representation of a control circuit connected to an electric arc furnace for melting ferrous materials in the production of steel.

The method of the invention is best described by way of the following example:

An arc furnace with a capacity of 50 tons at 30/36 MVA (Megavoltamperes) was charged with mixed steel scrap. The measured value of the effective power at the arc was measured and was 0.7 during the melting period. After the formation of the molten metal bath, sponge iron pellets were continuously fed into the furnace. The effective power increased to 0.74. By changing the set value of the current input to the electrodes by a specified amount, according to the previous measurement, the effective power was reduced back to the desired level of 0.7.

This adjustment may be effected by an arrangement exemplified by means of the control circuit schematic of FIG. 1.

As shown in FIG. 1, three electrodes 11 are arranged inside of an arc furnace 10, and are connected to an electrical measuring or control circuit by a transformer 1. The electrode current as well as the electrode voltage are set at the required values, in accordance with predetermined measurements discussed above (through resistances 6, 6a, and 7; rectification over transformers 2 and 3; and comparison with resistance 4). The differential current or bias resulting from the unbalance is amplified or is fed directly into control element 5. By short circuiting a certain amount in accordance with predetermined measurements under the specific operating conditions, as discussed above the resistance 6a in the control circuit by means of a magnetic switch or relay 26, at the time of charging the sponge iron pellets, the magnitude of the altered input is brought to its desired value by altering the original or preset value of the input of current. As a consequence thereof, a new relationship between voltage and current is established and the desired effective power is maintained or kept within the desired limits.

While the methods and forms of apparatus herein described constitute preferred embodiments of the invention, it is to be understood that the invention is not limited to these precise methods and forms of apparatus, and that changes may be made therein without departing from the scope of the invention, which is defined in the appended claims.

We claim:

1. In a method for preserving the internal walls of a molten bath-containing electric arc furnace, to which sponge iron is to be added, said furnace having electrodes including power supply means to develop an electric arc between each of said electrodes and said bath and being of the type in which the amount of power supplied the electrodes is controlled in accordance with the current in the electrodes and the voltage across said arcs, the steps comprising:
  a. energizing said electrodes by said power supply means prior to the introduction of the sponge iron thereby establishing and maintaining said bath,
  b. thereafter introducing the sponge iron into said furnace, whereby the power energizing the electrodes tends to be increased, and
  c. adjusting the electrode current and the voltage drop across the arcs upon the introduction of the sponge iron to decrease the power energizing the electrodes, thereby protecting the internal walls of the furnace from overheating by counteracting the power increase effect caused by said introduction of the sponge iron.

2. The method of claim 1 wherein
  a. the step to decrease the power energizing the electrodes is carried out by adjusting the electrode current alone.

3. The method of claim 2 wherein
  a. the step of adjusting the electrode current is carried out by setting said power supply means to operate in a first mode prior to said introduction of sponge iron to energize the electrodes thereby establishing and maintaining said bath, and
  b. thereafter operating said power supply means in a second mode upon the introduction of said sponge iron to decrease the power energizing the electrodes thereby negating the power increase effect caused by said sponge iron introduction.

4. The method of claim 3 wherein
  a. said sponge iron introducing step is carried out by feeding said sponge iron into said furnace through a gate, and
  b. said second mode operating step is carried out by interconnecting said power supply means to said gate.

* * * * *

UNITED STATES PATENT OFFICE
CERTIFICATE OF CORRECTION

Patent No. 3,999,976             Dated December 28, 1976

Inventor(s) Hans-Joachim Schubert, et al.

It is certified that error appears in the above-identified patent and that said Letters Patent are hereby corrected as shown below:

In the title page, Column 1, line 7, cancel
"[73] Assignee: Demag Aktiengesellschaft, Duisburg, Germany" and insert --[73] Assignee: Demag Aktiengesellschaft, Duisburg, Germany , and Korf-Midland-Ross Holding Aktiengesellschaft, Baden-Baden, Germany, part interest each--.

Signed and Sealed this

Twenty-fifth Day of October 1977

[SEAL]

Attest:

RUTH C. MASON  
Attesting Officer

LUTRELLE F. PARKER  
Acting Commissioner of Patents and Trademarks